United States Patent [19]

Vinal

[11] Patent Number: 4,626,946
[45] Date of Patent: Dec. 2, 1986

[54] TWIN TRACK VERTICAL READ-WRITE HEAD STRUCTURE

[75] Inventor: Albert W. Vinal, Cary, N.C.

[73] Assignee: International Business Machines Corporation, Armonk, N.Y.

[21] Appl. No.: 584,364

[22] Filed: Feb. 28, 1984

[51] Int. Cl.$^4$ .......................... G11B 5/30; H01L 43/00
[52] U.S. Cl. .................................. 360/113; 338/32 R
[58] Field of Search ............... 360/113, 122, 123, 126, 360/47; 338/32 R; 324/252

[56] References Cited

U.S. PATENT DOCUMENTS

| 3,860,965 | 1/1975 | Voegeli | 360/113 |
| 4,306,215 | 12/1981 | Jeffers | 338/32 R |
| 4,413,296 | 11/1983 | Jeffers | 360/113 |

Primary Examiner—John H. Wolff
Attorney, Agent, or Firm—Edward H. Duffield

[57] ABSTRACT

An improved read-write head for twin track vertical magnetic recording is described. Inductive, solid state, or magneto-resistive sensors may all be employed with the new read-write head structure. A preferred embodiment utilizing a magneto-resistive coupled film sensor for read back which saturates to allow writing is disclosed.

19 Claims, 16 Drawing Figures

TRACK B    TRACK A

TWIN TRACK VERTICAL READ-WRITE HEAD STRUCTURE

FIELD OF THE INVENTION

This invention relates to magnetic read-write head structures in general, to magneto-resistive thin film head structures in particular and to twin track recording techniques.

RELATED APPLICATIONS

This application is related to my own co-pending commonly assigned applications Ser. No. 388,783 now U.S. Pat. No. 4,484,238 relating to the generic twin track recording method and Ser. No. 388,784 now U.S. Pat. No. 4,485,419 relating to a twin track read head structure employing magnetically sensitive transistors as a sensitive element.

BACKGROUND OF THE INVENTION

A wide variety of magnetic read-write head structures exists. Among these, the structures which are adapted for both reading and writing employ one of several technologies such as inductive, magneto-resistive or other solid state (Hall or magnetic transistor) sensors. The preferred embodiment described herein addresses several problems with the known prior art.

Little is known as to any prior twin track reading and writing head structures or techniques. The most similar read-write head structures are generically different from those presented in this application but a brief review of them is offered as an aid to understanding the present invention.

U.S. Pat. No. 4,413,296 illustrates a single track read head employing a thin film magneto-resistive sensing element. In this structure, no means is provided for establishing and maintaining an anti-parallel magnetic couple having the preferred magnetization orientation directed along the easy axis of the MR films. This means that unless single domain magnetic films are employed, Barkhausen noise will be present from the shifting multi-domain walls. The Barkhausen noise effect is a particularly significant problem as will be appreciated by those of skill in the art. Furthermore, the difficulties in establishing a single domain magnetic film are technically prohibitive at present. In addition, in structures such as that shown in the aforementioned patent, demagnetizing fields are automatically created in both films whenever external magnetic fields are applied along either the X or Y axis. The demagnetizing fields will be evident at the edges or ends of the films and will tend to create multi-domain walls with the attendant increase in Barkhausen noise. As the relative size of such sensors is reduced to accommodate smaller recording tracks with the consequent higher density, the effects of the Barkhausen noise become overwhelmingly important.

Another typical prior art sensor that has the advantage of providing a differential signal output is shown in the U.S. Pat. No. 3,860,965, commonly assigned to the assignee hereof. While this structure exhibits significant advantages in having a differential output, no means is provided for establishing the anti-parallel couple within the twin films in a direction of preferred magnetization oriented along the easy axis. Again, the problem of multi-domain walls shifting and creating Barkhausen noise is present. In addition, demagnetizing fields will be introduced in both films whenever an external field is applied along either the X or Y axis; the effect of the demagnetizating fields is to reduce the signal output available and to encourage the formation of multi-domain walls with the concommitant result of increased Barkhausen noise.

A further problem with known prior art magneto-resistive or inductive or solid state magnetic read-write head structures is that the sensor element must often be placed in very close proximity to the magnetic record in order to experience enough magnetic flux to provide a usable output. This results in problems with head to recording medium contact and wear problems well known to those skilled in the field. It would be desirable to remove the sensitive element to an elevation above the recording medium without reducing the sensitivity thereof.

OBJECTS OF THE INVENTION

The present invention has as one of its objectives the achievement of an improved structure for vertical twin track recording or reading. The use of twin magnetically recorded tracks with oppositely polarized magnetic regions achieves a complete flux coupling that improves the flux available for a sensor located at a distance above the recording medium and makes possible reduction of head to medium wear problems.

Another object of the present invention is to provide an improved twin track read-write head structure in which a high sensitivity sensor may be employed for reading and in which the reliable inductive technique may be employed for writing.

Still a further object of the present invention is to provide an improved magneto-resistive twin coupled film read head structure in which means are provided for creating and maintaining a preferred magnetic anti-parallel couple in the films along the desired easy axis.

Yet a further object of the present invention is to provide an improved read-write head structure in which demagnetizing fields introduced in the sensitive area of the structure when coupled magnetic film sensors are used are eliminated by providing balanced counteractive effects through a reorientation of the easy axis orientation with respect to the direction of flux passage through the element.

SUMMARY

The foregoing and still other objects of this invention which have not been enumerated are provided in an improved read-write head structure using a vertical twin track reading and writing method. The structure employs a generally U-shaped inductive read-write mechanism which may preferably be employed in tandem with a second U-shaped structure incorporating a coupled thin film magneto-resistive sensor having the easy axis of magnetization arranged perpendicular to the direction of current passage through the sensor. This achieves a balanced demagnetizing effect that eliminates or greatly reduces the tendency to create multiple domain walls and to reduce or eliminate Barkhausen noise. Additionally, the inductive read-write structure portion may be employed during read back to magnetically bias the MR structure portion so that the MR films will be bidirectionally sensitive to magnetic flux. In addition, a sustaining current may be passed through the MR device films to establish the anti-parallel couple along a preferred axis arranged orthogonal to the direction of passage of flux through the thin films.

These and other attributes of the present improved read-write head structure are described with respect to a preferred embodiment and an illustrative set of drawings as follows.

DETAILED SPECIFICATION

In FIG. 1, a generic form of the preferred embodiment of the present invention is described in the schematic view. A substrate 1 of non-magnetic material, which may preferably be silicon or the like for ease in constructing the other elements of the read-write head using semiconductor processing methods, is shown. The substrate 1 has deposited on its upper surface a magnetically permeable generally U-shaped structure 2. This is schematically shown as being provided with a coil 3 and contacts 4 for energizing the coil 3 electrically. The magnetically permeable member 2 is generally configured in a U shape and has two legs 5 which may interface a magnetic recording medium or, as shown in FIG. 1A, a second magnetically permeable structure. The legs 5 are generally oriented parallel to one another and are so arranged that their long dimension is in the plane of the drawing 1A at the end faces 5A. The footprint of these surfaces 5A upon the second magnetically permeable member 6 or upon a magnetic recording medium shows the generic orientation of the twin track vertically polarized read-write system as depicted in FIG. 2A. This footprint has the long dimensions of each of the legs 5A shaded as shown. It will be observed that the projections of the legs 5A upon a plane of the recording medium have their maximum dimensions each lying in the same common plane perpendicular to the plane of the recording medium. This distinguishes the two legs and their orientation with respect to each other and to a recording medium from the usual two-leg structure such as that shown in U.S. Pat. No. 4,413,296 mentioned previously in which the maximum dimensions of the end faces of the read-write head will be footprints that are parallel to each other and cannot lie in the same plane arranged vertically to the plane of the recording medium.

Figure 1A:
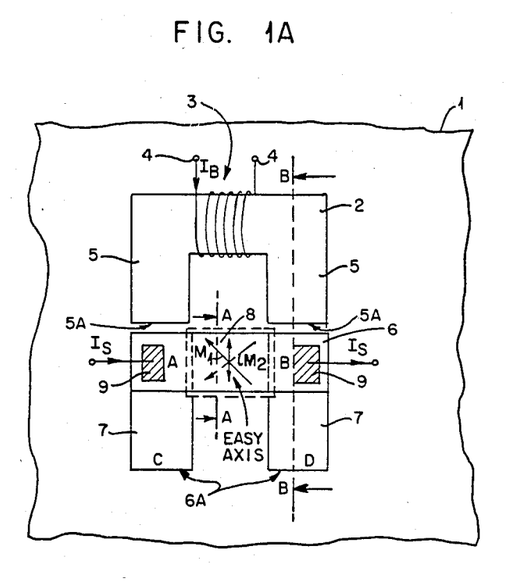
FIG. 1A is a schematic view of the structural arrangement of the elements in a preferred embodiment of improved read-write head in accordance with the principles of the present invention.
Figure 1B:
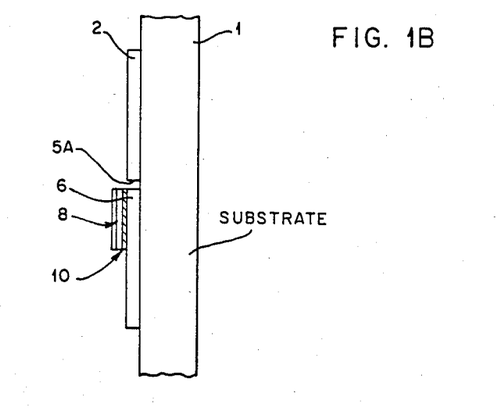
FIG. 1B is a cross-sectional view of the structural elements shown along line BB in FIG. 1A.
Figure 2A:
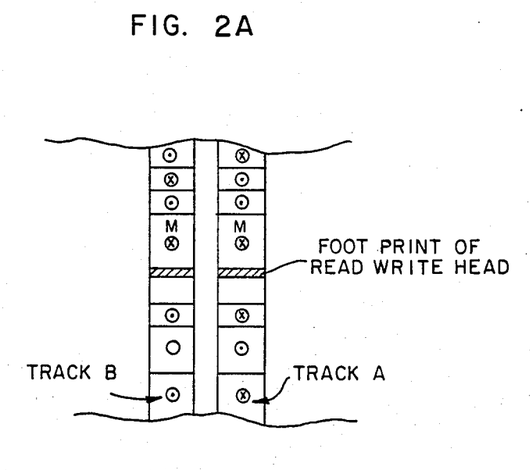
FIG. 2A illustrates a plan view of a magnetic recording medium having twin complementarily poled magnetic signal paths in tracks A and B in accordance with the principles of vertical twin track recording.

Continuing with the description of the structure in FIG. 1A, a second magnetically permeable member 6 having two magnetically permeable legs 7 is shown. A bridging member 8 comprising a coupled film magneto-resistive sensor element of a preferred form in accordance with the invention is also illustrated. Contacts 9 provide means of energizing the MR film element 8 across the bridge between legs 7 to provide output signals. The end faces of the second magnetically permeable member 6 are shown as end faces 6A and these would confront a magnetic recording medium having a footprint thereon as shown in FIG. 2A. It will be observed that the coupling legs 7 would normally be arranged perpendicular to a recording medium so that the substrate 1 would appear vertically oriented as shown in the cross-sectional view in FIG. 1B. The substrate 1 would be ground away in packaging such a read-write head to expose the end faces 6A. However, in order to understand the basic structure and its mode of fabrication, this has not been illustrated in FIGS. 1A and 1B. The substrate 1 may be a semiconductive material such as silicon in its intrinsic state, i.e., without doping so that it is essentially a non-conductor or insulator. This is convenient and facilitates fabrication of the magnetically permeable elements and the MR elements utilizing planar deposition processes usually employed in the semiconductive LSI industry. It will be observed that there is a gap between the end face 5A of the first magnetically permeable element 2 and the top surface of the second magnetically permeable member 6. This gap establishes a magnetic reluctance between the first and second magnetically permeable structures which will be described in greater detail later.

The magneto-resistive coupled film elements shown generically as the bridging element 8 between the legs 7 of the second magnetically permeable structure 6 are shown in the cross-section 1B as two adjacent layers. The actual structure will be described in greater detail but it should be pointed out that an insulative layer 10 of silicon dioxide or the like may be used to electrically separate the magnetically sensitive MR legs 8 from the coupling legs 7 of the second magnetically permeable structure 6.

The first and second magnetically permeable members 2 and 6 may preferably be constructed of permalloy, which is a nickel, iron alloy well known in the field. It will also be observed that there is a reluctance path between the legs 7 and the bridging member 8 which comprises the MR sensor and the amount and relative magnitude of this reluctance in proportion to the reluctance of the gap between the surfaces 5A and the top surface of the element 6 is also important as will be described later. In addition, there is a variable reluctance of the MR bridging element 8 which must be taken into account as will be later described.

Figure 1C:
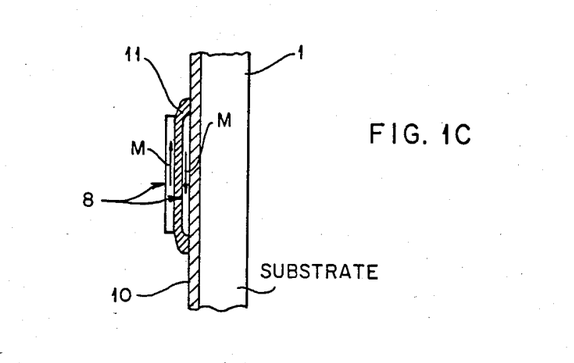
FIG. 1C is a cross-sectional view along lines AA in FIG. 1A.

Turning to FIG. 1C, an enlarged cross-section along lines AA in FIG. 1A is illustrated. The magneto-resistive element comprising the twin coupled films 8 is shown in greater detail. They are deposited along the insulative layer 10 to separate them from the substrate 1 in the electrical sense. The two magnetic films 8 are also separated from one another by a thin, non-magnetically permeable conductor such as a titanium layer. The titanium layer may, however, be in electrical contact if desired. The relative thicknessess of the various layers have some importance in establishing the coupled anti-parallel magnetic pair in the films 8. This is now understood in the field but is described in my thesis "On Magnetic Coupling of Anisotropic Thin Magnetic Films" submitted in partial fulfillment of the requirement for the degree of Master of Electrical Engineering, graduate school of Syracuse University, April, 1969. In this thesis, the mutual demagnetizing effect of coupled films is described and it is shown that the films must be separated by a critical distance so that the mutual demagnetizing effect may be overcome and the magnetic vectors in the parallel films may be arranged to form an anti-parallel couple. The critical dimension is approximately 200 Angstrom units. It will be observed in FIG. 1C that a titanium layer of approximately 300 Angstrom units in thickness separates the two magneto-resistive films 8 as shown.

For purposes of discussion, the magnetic films may be nickel iron of approximately 200 Angstrom units thickness each and the magnetically permeable members shown in FIGS. 1A and 1B may be the permalloy material of approximatley 3000 Angstrom units thickness. The layers 10 shown in FIGS. 1B and 1C may be illustratively 1000 Angstrom units thickness silicon dioxide.

Figure 1D:
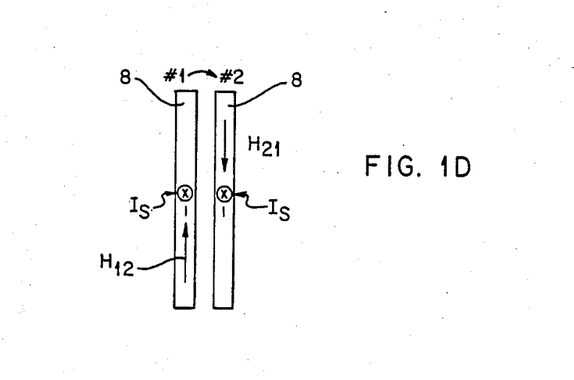
FIG. 1D illustrates the principles of the complementary anti-parallel easy axis coupled twin film bias fields.

In FIG. 1D, a magnetic film pair 8 having an electrical current directed into the plane of the paper as shown by the conventional circle with an X in it are illustrated. The anti-parallel magnetic couple is established by passing a current in the direction shown which creates the magnetic vectors H12 and H21 in the left and right films, respectively. These are shown by the vector arrows so labeled. Given this configuration, a closed magnetic path exists with the complementary poles closed through the air gap at each end between the two films. This closure takes place in the structure shown in FIG. 1C through the 300 Angstrom unit thick titanium layer. As long as a current is passed through the layers of films in FIG. 1D in the direction shown, a stable anti-parallel magnetic couple will exist in the two films and a balanced set of complementary magnetic poles will persist. This establishes a preferred anti-parallel magnetic couple along an easy axis of magnetization which is chosen to lie along the short axis of the films as depicted in FIG. 1A. This is the direction generally perpendicular to the passage of signal current and to the direction in which magnetic flux from the coupling legs in the second magnetically permeable member 6 will direct flux through the bridging element of the twin films 8.

Figure 2B:
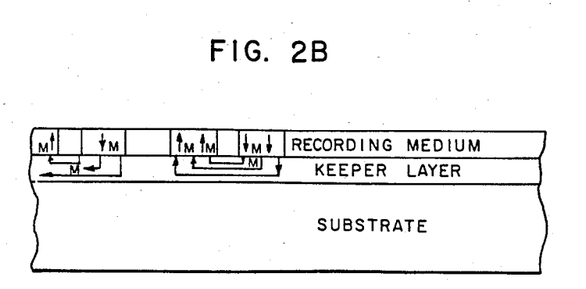
FIG. 2B is a cross-sectional view through the recording medium showing the keeper layer and substrate to be employed with vertically writable magnetic media.

It is to be understood that the end faces 6A of the second magnetically permeable structure would interface a magnetically recorded medium such as that shown in FIGS. 2A and 2B and the resultant flux from the complementarily poled transitions as shown in 2A would be coupled through the end faces 6A of the legs 7 in the second permeable magnetic structure 6 and would pass through the insulative layer 10 shown in FIG. 1B and longitudinally through the magnetically sensitive MR film pair 8. This would be a direction generally orthogonal to the chosen easy axis and parallel with the axis of signal current through the MR film pair and is a distinct departure from the arrangements in the prior art. The magnetically sensitive magneto-resistive material layers 8 are separated by a titanium layer as shown in FIG. 1C as layer 11. However, where the magnetically sensitive elements overlie the coupling legs 7, the titanium layer 11 is removed and the legs 8 are in electrical contact with one another, generally in the region shown as contact areas 9 in FIG. 1A. Thus, a current may be passed through the elements 8 in the direction such as that depicted in FIG. 1A by the current vector $I_s$ which is also shown in the cross-sectional FIG. 1D. This is the sustaining current for creating the anti-parallel magnetic couple in the twin magneto-resistive films 8. The operation of the structure depicted in FIGS. 1A through 1D will be described in greater detail shortly. First, however, it is necessary to discuss some of the prior art arrangements of coupled magnetic film pair sensors utilized in various read head embodiments of the prior art.

Figure 3A:
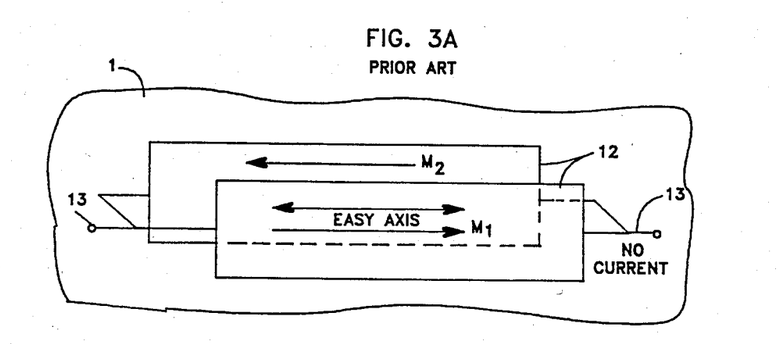
FIG. 3A illustrates a generic prior art mangeto-resistive sensor in the absence of a bias current passing through the easy axis of the device.
Figure 3B:
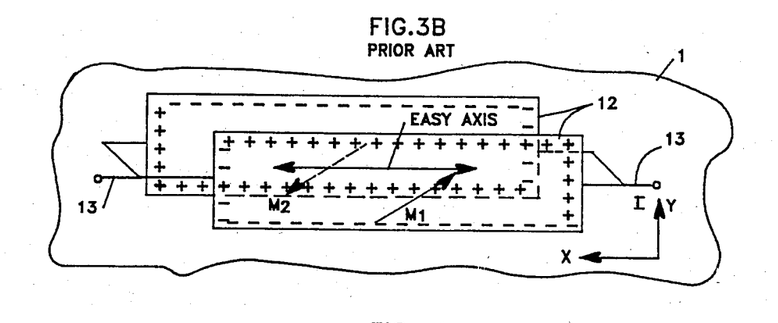
FIG. 3B illustrates the prior art MR sensor of FIG. 3A in the presence of a biasing current I passing along the easy axis.

The first of these is shown generically in FIGS. 3A and 3B. In FIG. 3A, an anti-parallel coupled film pair 12 is depicted. The magnetic anti-parallel vectors $M_1$ and $M_2$ are shown as oppositely directed. For purposes of convention, the topmost layer has the solid arrow $M_1$ and the bottom layer has the dotted arrow $M_2$ as shown in FIG. 3A. The contacts 13 facilitate passage of a bias current through the MR pair 12 along the easy axis which is shown to be parallel with the long dimension of the pair as depicted in FIG. 3A. In FIG. 3B, in the presence of a bias current I flowing between contacts 13 through the MR pair 12, the magnetic anti-parallel couple vectors $M_1$ $M_2$ are angled with respect to the easy axis at angles $\theta_1$ and $\theta_2$, respectively. These will normally be equal angles as will be understood by those of skill in the art. In addition, a small schematic of an orthogonal axis pair XY is shown for purposes of orientation in FIG. 3B.

It should be first understood that the device depicted in FIGS. 3A and 3B will exhibit no net change in resistivity given in a magnetic field supplied along either the X or Y axis even in the presence of a biasing current which torques the magnetic vectors $M_1$ $M_2$ by the angles $\theta_1$ and $\theta_2$, respectively as depicted in FIG. 3B. This is true because, for example, a magnetic field applied generally along the easy axis, the X axis as shown in FIG. 3B, will increase angle $\theta_1$ by some amount but will decrease angle $\theta_2$ by the same amount. The net effect is no net change in resistivity as measured between the contacts 13.

Secondly, there is no means provided for establishing a stable anti-parallel couple in the preferred orientation along the easy axis of magnetization in the structure of FIGS. 3A and 3B. The anti-parallel magnetic couple $M_1$ $M_2$ does not occur naturally and is self-defeating once created due to demagnetizing effects resulting from the unbalanced coupled poles that will exist when an energizng magnetic field is applied along either the X or Y axis or any combination thereof. For example, in FIG. 3B, given a magnetic field applied along the Y axis angle $\theta_1$ will increase if a field is directed upward in FIG. 3B and angle $\theta_2$ will decrease. This will result in an increase of positive poles along the top edge of the top film of the pair 12 due to the rotation of vector $M_1$ but a decrease in the positive poles along the bottom edge of the second member of the pair due to the rotation of the vector $M_2$. Of course, the respective south poles along the respective edges of the films are similarly affected; the result is that the north to south coupling between the two films at their top and bottom edges respectivley, is not in balance. This will result in a net demagnetizing field being established which will tend to lower the sensitivity of the coupled pair and, more importantly, will tend to create numerous, generally random and uncontrolled domain boundary walls within the magnetic structure of the films 12. This has the unfortunate result of producing a significant amount of the unwanted Barkhausen noise in any output signal due to the random shifting and reorienting of the domain walls. Since no means for establishing and maintaining the preferred easy axis anti-parallel magnetic couple has been shown in FIGS. 3A and 3B, it is of course a structure not suited to operation as a magnetic sensor in a read head, but it has been discussed in preparation for a better understanding of the prior art.

Figure 4:
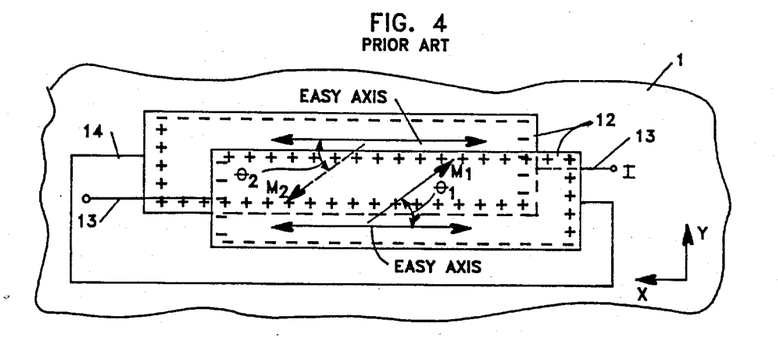
FIG. 4 illustrates schematically the coupled film arrangement of prior art U.S. Pat. No. 4,413,296.

FIG. 4 illustrates schematically a pair of magneto-resistive films 12 electrically connected through contacts 13 and an auxiliary conductor 14 as shown in U.S. Pat. No. 4,413,296. The easy axis of magnetization is chosen as shown in that patent to be parallel with the long axis of the film pair 12. Current I may be passed through the pair in the path which is facilitated by the contacts 13 and the conductor 14 as illustrated. This will result in the anti-parallel couple $M_1$ $M_2$ being torqued by equal but opposite amounts to modify the angles $\theta_1$ $\theta_2$ in similar fashion as was discussed with respect to FIG. 3B. This is true since no means is provided for establishing the anti-parallel magnetic couple with the preferred magnetization orientation lying along the easy axis. The patentee describes the use of single domain films for the magnetic films 12 and this may be a great asset if it is provided as described. However, no means has been shown for establishing the original anti-parallel couple along the easy axis (the X axis) as shown in FIG. 4. The net result is that demagnetizing fields will be created by the rotation of the magnetic vector couple in both films when external fields are applied along either the X or Y axis in similar fashion to the described in FIG. 3B. Barkhausen noise will be present in any multi-domain films as will be easily understood. The imbalanced or imperfect coupling of the films 12 in FIG. 4 results from unequal torquing of the magnetic vectors $M_1$ and $M_2$ respectively. However, as described by the patentee, the easy axis is preferably not located along the X axis as shown in FIG. 4. It will be canted at some small angle $\theta$ as described in that patent. This has the net result of making the film structures bidirectionally sensitive which is indeed a good advantage so that the sense currents flowing from the respective films are provided with the same spatial direction of flow and mutual biasing of these two structures (i.e., mutual coupling therebetween) is avoided.

The imbalancing effect of externally applied magnetic fields either along the X or Y axis in FIG. 4 is the same as that in FIG. 3B where a similar prior art structure was described. Net demagnetizing fields thus created are a deterrent to sensitivity of the structure and may result in the creation of multi-domain walls with the concomitant increase in Barkhausen noise. If single domain films can be created and employed as described by the patentee, this problem may be reduced, but the complexity and expense of creating single domain films are significant drawbacks. In addition, no means of creating and sustaining the preferred anti-parallel couple between the two films 12 in FIG. 4 has been shown. Presumably the anti-parallel couple is formed by permanently magnetizing the films in opposite direction when they are originally created. However, the imbalance in demagnetizing fields experienced when externally applied fields are imposed on the structure may disorient and eventually disrupt the preferred anti-parallel couple which will result in reduction in sensitivity and increase in noise.

Figure 5:
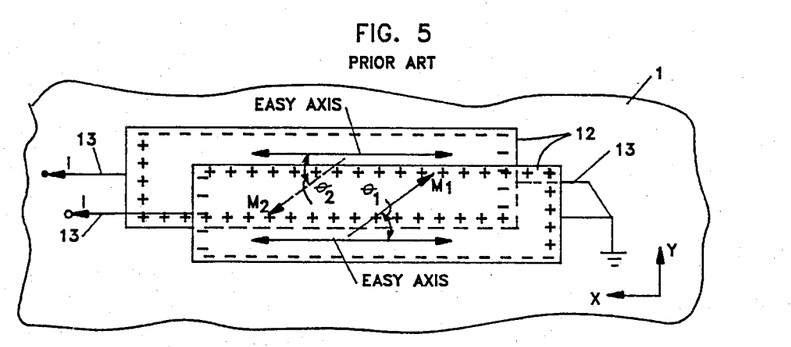
FIG. 5 illustrates schematically the arrangement of the prior art U.S. Pat. No. 3,869,965.

FIG. 5 illustrates another prior art twin film pair 12 arranged in an electrical connection pattern which is different from that shown in FIG. 4. In FIG. 5, schematically depicting the arrangement of U.S. Pat. No. 3,860,965, the contacts 13 direct biasing current I through parallel films 12 in the same direction. The easy axis is assumed to be along the X axis and the passage of the current I will torque the magnetic vectors $M_1$ and $M_2$ through angles $\theta_1$ and $\theta_2$, respectively. In this device, a significant advantage is that the output will be differential and may be conveniently measured between the two output terminals 13 which are not connected to ground. However, no means has been provided for establishing and maintaining the preferred anti-parallel magnetic vector couple with a preferred orientation along the easy axis. When externally applied magnetic fields are directed along either the X or Y axis, demagnetizing fields will be introduced in both films 12 resulting from the different effect of the angles $\theta_1$ and $\theta_2$ as discussed with respect to FIG. 3 previously. In addition, Barkhausen noise will be present where multi-domains exist within the films 12 in FIG. 5. Indeed, the effect of the demagnetizing fields created by the application of external magnetic fields to be sensed by the films will tend to create or move domain walls within the films and more particularly so as the size of the films is reduced to accommodate higher and higher density recording patterns.

With respect to FIG. 3B, FIG. 4 and FIG. 5, there is a magneto static balance between the vectors $M_1$ and $M_2$ in each case so long as the biasing current I is present. However, this balance is upset by the application of externally applied magnetic fields. This is true because there will be unequal effects upon the two angles $\theta_1$ and $\theta_2$, i.e., they will be in opposite direction with one angle being increased while the other is decreased.

Figure 6:
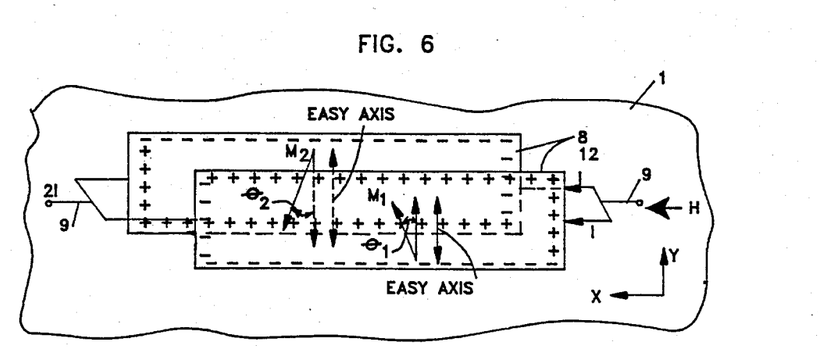
FIG. 6 illustrates schematically the arrangement of the present invention to be contrasted with FIGS. 4 and 5.

Turning to FIG. 6, a schematic view similar to FIGS. 3 through 5 is shown for the magneto-resistive sensor technology utilized in the present invention. In FIG. 6, the electrical contacts 9 are utilized for supplying the bias current I along the hard axis (X axis) of the coupled films 8. The easy axis is located along the Y direction which is perpendicular to the axis on which the bias current is supplied. The mutual field coupling between the film layers 8 in the presence of current I flowing longitudinally along the X axis establishes and maintains the easy axis anti-parallel couple in a prescribed direction as previously discussed with respect to FIG. 1D. The anti-parallel magnetic vectors $M_1$ $M_2$ are stable and balanced so long as the current I flows through each of the layers 8.

Application of a biasing magnetic field H as shown in FIG. 6 torques the magnetic vectors through angles $\theta_1$ and $\theta_2$ which are equal. This results in equal vector components of change in both X and Y direction for each of the individual vectors $M_1$ and $M_2$ and maintains a balanced condition without creating demagnetizing fields. The device will be sensitive to magnetic fields applied along the X axis in either direction and will cause either an increase or decrease in both angles $\theta_1$ and $\theta_2$. A signal response will then be observed between the terminals 9 and no net demagnetizing fields will result since there are no imbalances produced by opposite effects on the two coupled films. There will be no signal response observed for fields applied along the Y axis and hence, the film pair in FIG. 6 is essentially uni-axially sensitive. Because there are no demagnetizing fields and because the biasing current I establishes and maintains the anti-parallel couple in a balanced configuration on the easy axis perpendicular to the direction of current flow, there is no tendency to generate a plurality of independent magnetic domains with the consequent Barkhausen noise problem. It will be appreciated that this configuration is radically different from the configurations and result of FIGS. 3 through 5 of the prior art. In fact, the general solution of providing current conduction in the plane parallel to the hard axis of the MR films can be extended to correct the problems with prior art configurations such as those shown in FIGS. 4 and 5.

Figure 7:
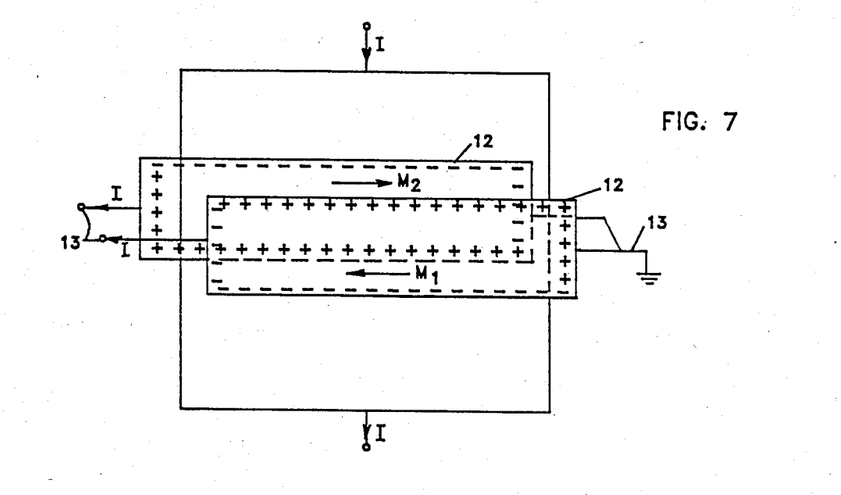
FIG. 7 illustrates a proposed arrangement for solving some of the problems in the prior art structure of FIG. 5.

This may be illustrated as shown in FIG. 7 where a sheet of conductive material in the generally planar form is passed between the two film layers 12 for a device configured such as that shown in prior art FIG. 5. This new resulting device will have a means of establishing and maintaining the preferred anti-parallel couple orientation for $M_1$ and $M_2$ as shown in FIG. 7.

Figure 8:
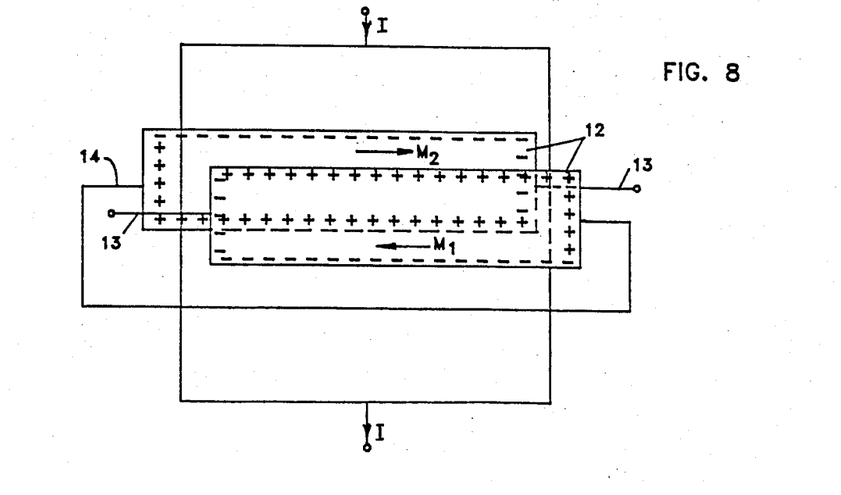
FIG. 8 illustrates a proposal for solving some of the problems in the prior art structure of FIG. 4.

In FIG. 8 a conductive plane is passed between the two layers 12 of a structure similar to that shown in prior art FIG. 4. This will also have the effect of inducing and maintaining the preferred anti-parallel couple if no bias current I is conducted between the terminals 13.

Returning to FIG. 6 and comparing it with FIGS. 7 and 8, it will be observed that the principle of passing a current through a plane parallel to the hard axis of the MR films is common to FIGS. 6, 7 and 8 but in FIG. 6 it is the films themselves which form the conductive plane. It is sufficient to pass a current through only one of the films since the creation of the magnetic vector in one will create its opposite pole image in the other film to complete a closed couple. The devices as depicted in FIGS. 7 and 8 will still exhibit the demagnetizing fields results when an externally applied magnetic field exists and are thus not as preferred as the embodiment of the invention.

In the preferred embodiment of the present invention, a read head employs a coupled pair of magnetic film elements having their magnetic anisotropy in the easy axis running in a direction perpendicular to the axis on which both the bias and signal current is supplied, i.e., along the hard axis. Such devices as sensitive to magnetic fields applied along the hard axis and respond in a balanced and stable fashion without creating demagnetizing fields, multiple domain walls and concommitant Barkhausen noise effects.

Figure 11:
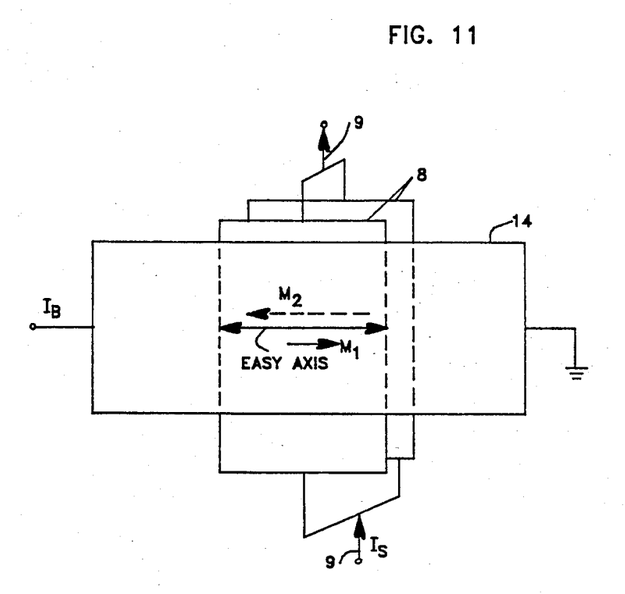
FIG. 11 illustrates an alternative method of biasing the MR sensor of the present invention.

In FIG. 11, the method of biasing the magnetically coupled vectors in the twin films of an MR sensor uses a separate parallel conductive plane carrying a bias current $I_b$. The sustaining current $I_s$ for creating the preferred easy axis stable couple is shown applied to contacts 9 and passing along the hard axis of the coupled films 8 as was the case for FIG. 6. In addition, a conductive plane 14 is shown. This plane is to overlie the coupled pair 8 and to conduct current $I_b$ in a direction perpendicular to the hard axis which is, of course, the signal current axis or long axis of the MR films. This will set up a bias field H along the hard axis and torque the preferred couple through an angle $\theta$ when $I_b$ is flowing. The plane 14 is to be electrically insulated from the MR films 8 as well be readily apparent. For ease in construction and proper function, the plane 14 overlies both films and is not sandwiched between the films.

Such structures as depicted in FIGS. 6 and 11 may be embodied in an improved read-write head as shown in FIGS. 1A through 1D to which reference is again made.

Returning to FIG. 1A, it was noted that electrical contact was made at contacts 9 at points A and B on the MR film couple 8. Electrical current with a density J is passed through both of the film layers 8 forming the coupled pair. This electrical current produces the mutual magnetizing field in each of the films 8 as previously disclosed. This forces an anti-parallel magnetic couple to exist in a stable and balanced fashion. The anti-parallel couple is oriented along the easy magnetic axis which is perpendicular to the long dimension of the film 8 and perpendicular to the direction in which either signal or bias current I is passed along the hard axis. The field intensity experienced in one film due to current flowing in the other is opposite in direction to the magnetizing field experienced in the other leg in response to current flowing in the first leg. FIG. 1D illustrates the principle and has been previously discussed. The magnitude of the magnetizing field in each of the films will be, $0.5J\sigma$. $\sigma$ is the thickness of each film layer 8 and J is the electrical current density.

In FIG. 1A the first magnetically permeable structure element 2 forms a closure or keeper path for a write current magnetic field that will be coupled through the air gap at the end faces 5A to the coupling leg 7. A magnetizing coil 3 energized through contacts 4 encircles the central portion of the top magnetically permeable member. The coil 3 has two functions. During reading operation, a unidirectional fixed bias field current is conducted by coil 3. This has the purpose of creating the magnetic vector H shown in FIG. 6 for rotating the magnetization vectors within each of the MR films 8 by the angle $\theta$. This rotation of the magnetic vectors away from the easy axis by an angle approximately $\pi/4$ radians allows the magneto-resistive films 8 to respond to magnetic fields applied in either direction along the hard axis. Magnetic fields coupled from the pole faces 6A at the end of the second magnetically permeable member 6 are conducted by the coupling legs 7 up to and through the MR film layers 8 which bridge between the two coupling legs 7 and complete the magnetically permeable member 6. Magnetic flux from a recorded magnetic medium will circulate through the contours C, A, B, D or D, B, A, C depending upon the polarity recorded in the tracks such as shown in FIG. 2A.

Figure 9:
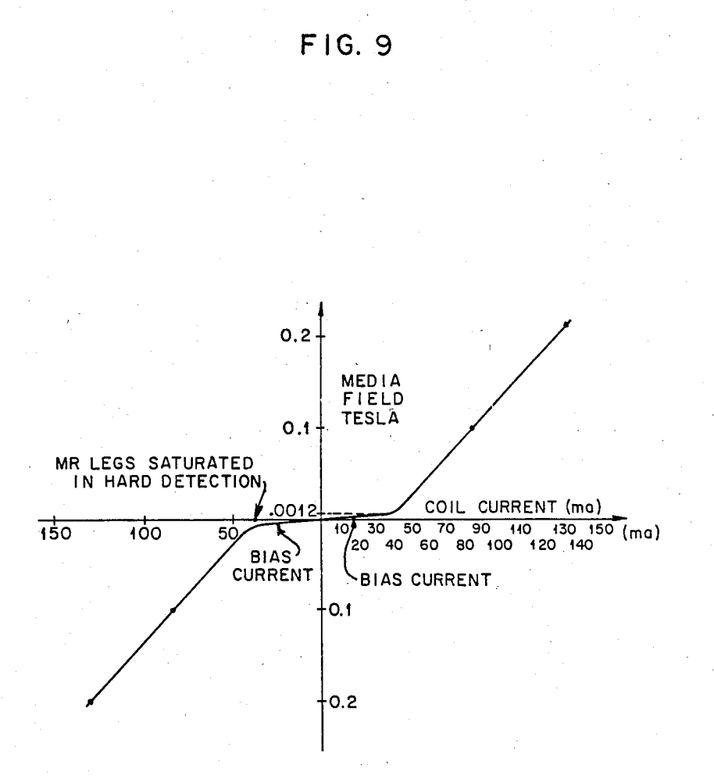
FIG. 9 illustrates the principle of saturating the MR sensor during writing of a magnetic medium as employed in the present invention.

The second function of the coil 3 is for writing new data in a vertically recordable magnetic medium. During the write mode, electrical current considerably in excess of the bias current used during reading is passed through coil 3 by means of the contacts 4. The effect of this electrical current is to magnetize the first magnetically permeable member 2 which will result in two oppositely polarized regions being written in a magnetic medium if the pole faces 5A at the ends of the coupling legs 5 are in proximity to a medium. From this it is evident that the first magnetically permeable member with its coil 3 may be used in the ordinary sense as an inductive read-write head. However, in the preferred embodiment illustrated in FIG. 1A, the magnetic flux generated at the faces 5A is impressed upon the second magnetically permeable member 6 and passes through the coupling legs 7 to magnetize the magnetic medium (not shown in FIG. 1A) at its areas adjacent to the faces 6A. Of course, some of the flux is conducted through the bridging element comprising the magnetic resistive layers 8 that completes the second magnetically permeable member 6. However, due to a unique property of the MR films, saturation occurs and once a critical value has been reached, no further flux is conducted by the coupling members 8. Thus, during the writing interval, the MR sensor leg comprising the MR film pairs 8 is saturated. That is, magnetization within the MR films 8 is forced to lie essentially along the hard magnetic axis and no additional flux will be passed once this level has been reached. This is illustrated in FIG. 9 and will be discussed.

The switching action of MR films allows a critical writing field to be coupled to the magnetic medium once a critical coil current has been achieved in coil 3 in FIG. 1A. For this circumstance, the permeability of the magneto-resistive film elements 8 when viewed along the hard axis is similar to an air gap once saturation has been achieved. It will be observed that the field seen by the magnetic medium at the interface with faces 6A of the second magnetic permeable member is quite low until a critical coil current for coil 3 is reached. At approximately 40 milliamperes as shown in FIG. 9, the MR films 8 will be saturated in the hard direction and will not further conduct flux. Any additional bias current or write current applied to coil 3 will result in coupling magnetic flux to the medium through the coupling legs 7 and not shunting it through the MR film pair 8.

When writing current is terminated in coil 3, the field that is produced by the reading bias current directed through contacts 9 to the magneto-resistive elements 8 torques the magnetization vectors within each of the layers 8 back toward the easy axis to form the stable anti-parallel easy axis couple. Domain wall ambiguity after writing is thus minimized along with the Barkhausen effect within the film layers 8. The anti-parallel couple which is stable virtually eliminates any easy axis demagnetizing field components within both films at rest and during both the read and write modes.

It will be observed that a gap between the top keeper or driver member described as the first magnetically permeable member 2 and the vertical coupling leg 7 will minimize shunting of field coupled from the magnetic storage medium through legs 7 to permit it to pass through the MR elements completing the second magnetically permeable member 6. The gap also regulates the amount of electrical current needed to write data into the storage medium because it minimizes the changing reluctance effects between the vertical legs 7 of the second magnetically permeable structure and the recording medium due to a variable flying height that occurs during the writing mode. If the gap between the first and second magnetically permeable elements 2 and 6 respectively did not exist, then the sensor elements 8 would only experience a small fraction of the signal field coupled from the medium through the vertical legs 7.

Additionally, the MR films 8 represent a reluctance that depends upon the level of magnetic flux being conducted. At saturation or above, the reluctance is approximately equivalent to an air gap. Below saturation, the reluctance is variable in a more or less linear fashion that is utilized during read back. There is also a third magnetic reluctance between the end faces 6A of the second magnetically permeable member and the surface of the recording medium.

The reluctances must be carefully chosen relative to one another such that the first reluctance between the first magnetic member and the second magnetically permeable member during reading is greater than the second magnetic reluctance between the ends of the MR film elements 8 which in turn should be less than the reluctance between the end faces 6A of the coupling legs 7 and the surface of the recording medium. This guarantees that flux coupled from the medium will be conducted preferentially through the MR films 8 and will not be shunted away through the first keeper member of magnetically permeable material 2 during the readback mode. During writing, the reluctance of the coupling between the legs 7 increases to be approximately that of an air gap when the MR elements 8 are saturated. This has the effect of increasing the reluctance there to a level greater than that between the end faces 6A and the record medium so that during the writing mode, flux is effectively coupled back to the medium instead of being shunted away through the MR legs 8.

The overall design illustrated in FIG. 1A also solves some of the other problems with the prior art. The fundamental physical problem of lapping the end faces and wear problems associated with the end faces of the coupling pole members where they are near the magnetic medium is solved since any wear that occurs on the magnetically permeable coupling legs 7 does not affect the sensor area in the film elements 8A. The first magnetically permeable member 2 having coil 3 wrapped about it and end faces 5A at the ends of the coupling legs 5 could be used in its own right to read and write magnetic twin tracks on a vertically recordable medium. However, greater sensitivity for readback can be achieved using the structure shown in FIG. 1A in which a second magnetically permeable member 6 has coupling legs 7 and sensor legs 8 bridging the coupling legs 7 employed as described. The sensing leg 8 may comprise not just the MR sensors disclosed but may incorporate a gap with a magnetic solid state sensor such as a magnetic transistor, Hall cell or the like placed therein. The size of the gap and the reluctance would have to be adjusted to accommodate writing and reading as previously described so long as the reluctance values relative to one another are maintained as previously described.

Figure 10:
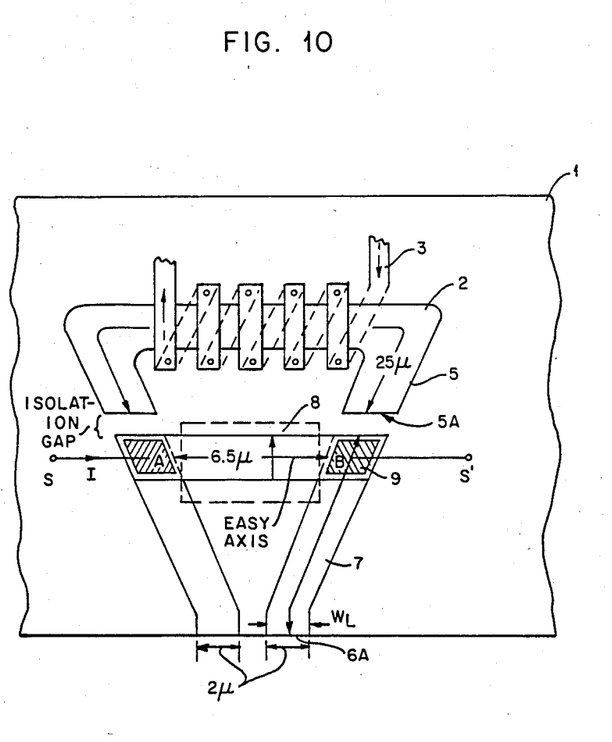
FIG. 10 illustrates a preferred embodiment of an improved read-write head in accordance with the principles of the present invention.

A preferred embodiment of a final read-write head design in accordance with the principles described herein is shown in FIG. 10.

In FIG. 10, coupling legs 7 are angled to bring their end faces 6A closer together at the interface of the magnetic recording medium. This establishes the recording track separation distance as shown in FIG. 2A. A coil 3 is borne upon an elongated section of the first magnetically permeable member 2 to accommodate a greater number of turns. In addition, the MR film element layers 8 are elongated relative to the distance between the end faces 6A to increase the signal output.

It has been conservatively estimated that 3000 twin tracks per inch will yield MR signal amplitude outputs of approximately 200 microvolts. By comparison, the inductive read head portion alone comprising the first magnetically permeable member 2 with its coil 3 may produce a signal of only a few microvolts. The equivalent internal noise input signal for the state of the art preamplifiers is approximately one microvolt and hence, it may be seen that the overall structure as depicted in FIG. 10 is preferred in comparison with using only the top half of the structure such as shown in FIG. 10 for reading and writing.

Having thus described my invention with reference to an improved embodiment thereof and having disclosed the principles of manufacture, operation and inherently critical criteria thereof, it will be apparent to those of skill in the art that numerous variations in physical structure and design may be employed without violating the basic principles described herein. Therefore, what is described in the claims which follow and which is desired to be protected by Letters Patent is to be taken by way of description only and not by way of limitation.

Therefore, what is claimed is:

1. An improved, twin track magnetic read-write head comprising a first magnetically permeable member having two legs and a connecting portion joining said two legs;
   an electromagnetic coil wrapped about a section of said first magnetically permeable member and wherein:
   the ends of said legs are arranged facing a magnetic medium for reading or writing magnetic signal records in two separate tracks to or from said magnetic medium and said first magnetically permeable member is configured such that the projections of said legs upon the plane of said magnetic medium have maximum dimensions that each lie in separate tracks and in a common plane perpendicular to the plane of said medium.

2. Apparatus as described in claim 1 further comprising:
   a second magnetically permeable member having two legs and a connecting member joining said legs;
   said second magnetically permeable member being positioned with its said connecting member adjacent to the end faces of said legs of said first magnetically permeable member, said second magnetically permeable member having the ends of its legs facing a magnetic medium for reading or writing magnetic signal records in two separate tracks from or to said medium, and;
   said second magnetically permeable member is configured such that the projections of its said legs upon the plane of said magnetic medium have maximum dimensions that each lie in separate tracks and in a common plane perpendicular to the plane of said medium.

3. Apparatus as described in claim 2, wherein:
   a first magnetic reluctance path exists between the end faces of said first magnetically permeable member and said connecting member of said second magnetically permeable member;
   a second magnetic reluctance exists between the ends of said connecting member of said second magnetically permeable member; and during reading said first and second reluctances have values such that said first reluctance is greater than said second reluctance.

4. Apparatus as described in claim 3, wherein:
   said connecting member of said second magnetically permeable member comprises a magnetic sensor means for sensing magnetic flux coupled from said magnetic medium by said two legs of said second magnetically permeable member.

5. Apparatus as described in claim 2, wherein:
   said connecting member of said second magnetically permeable member comprises a magnetic sensor means for sensing magnetic flux coupled from said magnetic medium by said two legs of said second magnetically permeable member.

6. Apparatus as described in claim 4 or claim 5, wherein:
   said sensor comprises a pair of magnetized magneto-resistive thin films in which the magnetic vectors are coupled in an anti-parallel fashion and wherein the easy axis of magnetization in each film is transverse to the path of signal current conduction through said films.

7. A magnetic record reading apparatus comprising:
   a magnetically permeable member having two legs joined by a connecting member in which said connecting member comprises a magnetic sensor having a pair of magneto-resistive thin films in which the magnetic vectors are coupled in an anti-parallel fashion and wherein the easy axis of magnetization in each film is orthogonal to the path of signal current conduction through said films.

8. A magneto-resistive coupled film read head structure having the easy axis of each said MR film arranged orthogonal to the axis of the film along which signal current passes and in which an anti-parallel magnetic coupling is established and maintained along said easy axis by passing an electrical current through at least one conductive plane in a direction parallel to the hard axis of said MR films.

9. Apparatus as described in claim 8, wherein:
   each of said films comprising said coupled film MR sensor is a conductive plane through which said electrical current is passed along said hard axis.

10. Apparatus as described in claim 7 or claim 8 wherein:
    at least a portion of each said magneto resistive film is in electrical and magnetic circuit contact with at least a portion of the other said magneto resistive film.

11. A method of biasing the magnetically coupled vectors in a coupled film MR sensor in which the easy axis is orthogonal to the signal current path to lie between the easy axis and the hard axis, comprising:
    passing a constant magnetic flux through the MR sensor along the hard axis thereof.

12. A method of biasing the magnetically coupled vectors in a coupled film MR sensor in which the easy axis is orthogonal to the signal current path to lie between the easy axis and the hard axis, comprising:
    passing a constant electrical current through a conductive plane electrically insulated from and perpendicular to the signal current path in said MR sensor.

13. A method of writing magnetic data through a magnetically permeable member comprising a coupled film MR sensor, comprising steps of:

magnetically saturating said MR sensor during writing and;

applying the magnetic flux to be written on a magnetic medium in parallel to said medium and to said MR sensor.

14. A coupled thin film magneto resistive magnetic read head structure having two magnetically coupled magneto resistive thin films, comprising:

means for subjecting said magnetically coupled magneto resistive films to two mutually orthogonal magnetizing fields, one of which magnetizing fields establishes an anti-parallel magnetic vector couple in said magneto resistive thin films parallel to an axis of magnetization thereof and the other of which magnetizing fields biases said anti-parallel magnetic vector couple to assume an angle relative to said axis.

15. Apparatus as described in claim 14, further comprising:

magnetically permeable coupling means for coupling magnetic fields to be sensed to said magneto resistive films in a direction parallel to one of said magnetizing fields.

16. Apparatus as described in claim 14 or 15 wherein:

said means for subjecting said magnetically coupled films to mutually orthogonal magnetizing fields comprises means for passing an externally generated magnetic field through said films along one of said orthogonal axes and means for passing an electrical current through a conductor in a direction parallel to the other of said orthogonal axes.

17. A method of establishing an anti-parallel magnetic vector couple to lie along a preferred axis of orientation thereof in a pair of parallel thin film magneto resistive sensors, comprising the step of:

passing an electrical current through an electrical conductor in a direction parallel to said thin magneto resistive films parallel to an axis thereof orthogonal to said preferred axis of orientation of said vector couple.

18. A method as described in claim 17, wherein:

said passing of electrical current comprises passing said current through at least one of said thin film magneto resistive sensors.

19. A method as described in claim 17, wherein:

said step of passing electrical current includes passing said electrical current through a conductor parallel to and insulated from and between said pair of thin film magneto resistive sensors.

* * * * *